April 13, 1937.  K. E. E. WESTBERG  2,076,757
OXYGEN VALVE
Filed March 16, 1935
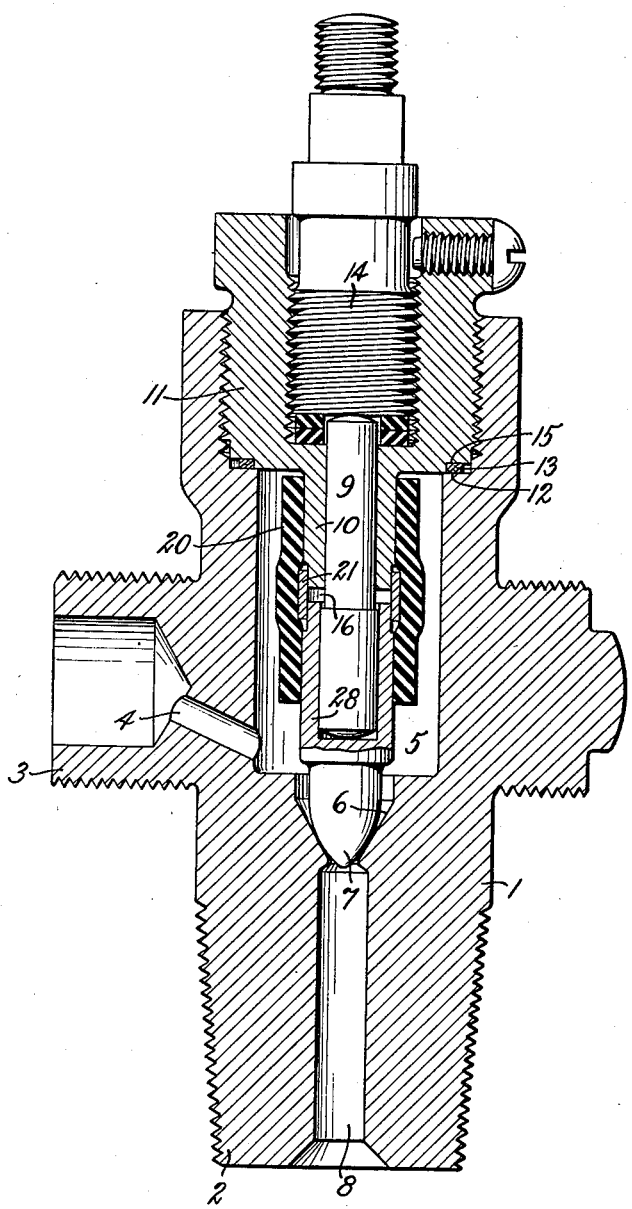
INVENTOR.
Karl Ewald Eugén Westberg
BY
his ATTORNEY.

Patented Apr. 13, 1937

2,076,757

UNITED STATES PATENT OFFICE 2,076,757

OXYGEN VALVE

Karl Ewald Eugén Westberg, Stockholm, Sweden, assignor to Svenska Aktiebolaget Gasaccumulator, Stockholm, Sweden, a corporation of Sweden Application March 16, 1935, Serial No. 11,393
In Sweden July 31, 1933

4 Claims. (Cl. 251—139)

This invention relates to valves for high pressure fluids, particularly gases, and has for its object to provide improvements therein as hereinafter set forth.

In valves for high pressure fluids, the provision of a gas-tight joint around the valve spindle, or equivalent part, has always presented great difficulty. Attempts have been made to solve this difficulty by means of a resilient cylindrically-shaped packing of, for instance, rubber, arranged with its middle portion of larger diameter than that of its two ends. A gland has been arranged around the spindle of the valve to compress the resilient packing in an axial direction so that its convex middle portion will be further expanded and caused to press tightly against an internal cylindrical recess or housing.

However, practice has proved that such arrangements are not durable, as relatively soon they will cease to be gas-tight, chiefly due to the friction between the valve spindle and the resilient packing, which causes a roughened or damaged surface on the rubber packing.

According to this invention there is provided in a valve for high pressure fluids, a construction whereby the space or junction between the movable part of the valve mechanism and a fixed part of the valve structure is enclosed by a sleeve-like packing element of resilient material, which is subjected to the fluid pressure on its outer surface, the arrangement being such that during movement of the valve mechanism the said packing element is not subjected to any appreciable twisting stress or friction.

The invention moreover includes in a valve for high pressure fluids wherein the valve proper is moved axially, without being rotated, to open and close the valve, a construction whereby a cylindrical or sleeve-like packing element of resilient material surrounds the said valve proper and a fixed part co-axial with said valve and formed integral with, or attached to, the valve body.

The invention also includes in a valve for high pressure fluids wherein the valve proper (or part carried thereby) is mounted co-axially with a fixed part of the valve body and is adapted to be opened and closed without turning and by axial movement only, a construction according to which a cylindrical or sleeve-like packing element embraces both the valve proper (or part carried thereby) and the said fixed part, the arrangement being such that the said element is subjected to the fluid pressure on its outer surface, but is not subjected to any appreciable twisting stress or friction during opening or closing of the valve.

According to one embodiment of the invention, there is provided a valve for high pressure fluids of the kind comprising a valve proper furnished with a sleeve portion arranged co-axially with a corresponding extension formed on a gland nut or equivalent member, characterized by the fact that a sleeve-like or cylindrical packing element of resilient material is adapted tightly to embrace the outer surfaces of the said sleeve portion and extension respectively.

One embodiment of the invention is illustrated, merely by way of example, in the accompanying drawing, which is a sectional side elevation of a valve suitable for high pressures.

Referring to the drawing, the valve body 1 is furnished with a tapered threaded portion 2 for connection with the high pressure container, and a further threaded portion 3 for connecting the valve outlet to any member or conduit, as required. Through a channel 8 the high pressure container communicates with a chamber 5 formed in the interior of the valve body 1. The chamber 5 is provided at its base with a conical recess 6, which forms a seat for the valve member 7. The recess 6 opens into the channel 8, and in the opposite direction it communicates with the outlet through the passage 4.

At its other end, the valve member 7 forms a sleeve 28, which, by means of the valve spindle 9, is maintained in co-axial relationship with an extension 10 depending from, and forming part of, the gland nut 11. The gland nut 11 is screwed into the valve body in such a way that its flat end surface 15 leaves a narrow space adjacent a shoulder 12 of the valve body. Between the end surface 15 of the gland nut 11 and the shoulder 12 a gasket ring 13 is disposed, by means of which a gas-tight seal can be obtained without difficulty. The adjusting screw 14 is screwed into the gland nut 11, so that the inner end bears against the spindle 9, which in turn acts on the valve 7.

As the spindle 9 is freely rotatable with respect to the sleeve 28, the extension 10 and the adjusting screw 14, it will be observed that the valve member 7 opens and closes solely with an axial movement and does not turn; there is consequently no turning movement between the sleeve 28 and the extension 10.

Between the valve 7 and the valve seat 6, a gas-tight seal can be obtained by a careful finishing of the surfaces of the respective parts and sufficient pressure from the adjusting screw 14 and the spindle 9. Neither is there any difficulty in securing a gas-tight joint between the gland nut 11 and the valve body 1 against the pressure present when the valve 7 opens, the chamber 5 then being exposed to a high pressure. Such a seal can be made by means of the above mentioned gasket 13 for instance, as shown in the drawing. On the other hand, considerable difficulty arises in obtaining a reliable gas-tight seal for the opening 16 between the extension 10 and the sleeve 28.

However, according to this invention, this gas-tight joint is made in such a way that a cylindrical or sleeve-like packing element 20 of rubber, or some other suitable material, is arranged so that it embraces both the sleeve 28 and the extension 10. Consequently as distinguished from similar devices hitherto used, this packing sleeve 20 will not be subjected to any appreciable change of shape or frictional damage, while only a negligible lengthening or contraction of the packing sleeve 20 will take place when the valve 7 is opened or closed, that is, lifted or lowered, respectively. On account of the pressure existing in the chamber 5, the elastic packing sleeve 20 will be pressed against the outer surfaces of the sleeve 28 and the extension 10 in such a way that a perfect gas-tight joint or seal is obtained.

In such cases, where the space 16 between the sleeve 28 and the extension 10 is sufficiently large to permit of an axial displacement of the valve 7, a rubber packing sleeve 20 of the above mentioned kind would be forced into the space 16, and the movement of the adjusting screw would have the effect of pressing the trapped part of said packing sleeve towards the edges of the space 16, and the central part of the packing sleeve 20 would be duly destroyed in this way. To prevent such damage to the elastic packing sleeve, a metal ring 21 can advantageously be arranged around the extension 10 and sleeve 28 so as to bridge over the space 16.

It is especially important that the elastic packing sleeve 20 shall not be subjected to any twisting movement or stress, which would be the case if the spindle 9 were secured against turning. To prevent such a twisting movement or stress, the friction between the valve 7 and the conical recess or seating 6 must be so small, that after tightening up the gland nut 11, carrying the extension 10, the rubber packing sleeve is not appreciably stressed or deformed by the sleeve 28 tending to lag behind due to the friction of the valve 7 on its seat 6. In a practical embodiment of the invention, this is obtained by making the valve seat 6 conical, while the valve 7 has a curved profile as shown in the drawing. By this means, the total friction surface subject to turning between the valve 7 and the valve seat 6 will be limited to the circular line contact, along which the valve 7 touches the valve seat 6.

The invention is not confined to the precise form of valve illustrated, but can be modified advantageously in several ways without departing from the spirit of the invention.

I claim:

1. In a valve, a housing forming a valve chamber, a valve seat in said chamber, a valve member having a cylindrical portion, means for causing rectilinear movement of said member toward said seat, a cylindrical projection extending from said housing into said chamber in alignment with said valve member, a rigid ring having a cylindrical inner surface slidably overlapping the adjacent ends of said projection and said cylindrical portion, and a resilient hollow packing member engaging said projection and said cylindrical portion, substantially the entire length of said packing member being interiorly supported by said projection, said cylindrical portion and said ring.

2. In a valve, a housing forming a valve chamber, a valve seat in said chamber, a hollow cylindrical projection extending from said housing into said chamber, a pin reciprocally mounted in said hollow projection, a valve member mounted on said pin, a threaded member mounted in said housing and adapted to bear against one end of said pin to move said valve member toward said seat, and a resilient hollow packing member engaging said projection and said cylindrical portion, substantially the entire length of said packing member being interiorly supported by said projection and cylindrical portion against collapse due to fluid pressure within said chamber.

3. In a valve, a housing forming a valve chamber, a gland nut having threaded engagement with said housing and closing one end of said chamber, a conical valve seat in the other end of said chamber, a hollow cylindrical projection extending from said nut into said chamber, a pin reciprocally mounted in said hollow projection, a valve member mounted on said pin, said valve member having a convex surface so as to have line contact with said conical seat, a threaded member mounted in said cylindrical nut and adapted to bear against one end of said pin to move said valve member toward said seat, said valve member being formed with a cylindrical portion having a diameter substantially the same as that of said projection, and a resilient hollow packing member engaging said projection and said cylindrical portion, substantially the entire length of said packing member being interiorly supported by said projection and cylindrical portion against collapse due to fluid pressure within said chamber.

4. In a valve, a housing forming a valve chamber, a valve seat in said chamber, a hollow cylindrical projection extending from said housing into said chamber, a pin reciprocally mounted in said hollow projection, a valve member mounted on said pin, a threaded member mounted in said housing and adapted to bear against one end of said pin to move said valve member towards said seat, said valve member being formed with a cylindrical portion having a diameter substantially the same as that of said projection, a rigid ring slidably overlapping the adjacent ends of said projection and said cylindrical portion, and a resilient hollow packing member engaging said projection and said cylindrical portion, substantially the entire length of said packing member being interiorly supported by said projection, said cylindrical portion and said ring.

KARL EWALD EUGÉN WESTBERG.